Nov. 9, 1965    R. F. MAXWELL, JR    3,217,308
SHAFT ANGLE TRANSDUCER

Filed Nov. 16, 1962    2 Sheets-Sheet 1

INVENTOR
RICHARD F. MAXWELL, JR.

BY Claude Funkhouser
ATTORNEY
R. R. Anderson
AGENT

United States Patent Office 3,217,308
Patented Nov. 9, 1965

3,217,308
SHAFT ANGLE TRANSDUCER
Richard F. Maxwell, Jr., Baltimore, Md., assignor, by mesne assignments, to the United States of America as represented by the Secretary of the Navy
Filed Nov. 16, 1962, Ser. No. 238,310
8 Claims. (Cl. 340—196)

The present invention relates to a shaft position indicator and more particularly to a shaft angle transducer for remotely indicating the angular position of a shaft, such as would be used in a servomechanism system, the device being compact in size, easily constructed, and extremely accurate.

Many prior art shaft angle transducers are cumbersome in size, large in physical dimensions, and the electrical type often contain a number of sizeable electrical coils. Furthermore, where they are used in servomechanism systems, the older devices may possess an undesirable inherent dynamic lag in comparison with the dynamic response characteristics of the rest of the system, as well as an unwanted inaccuracy in the static or steady-state sense.

The shaft angle transducer of the present invention, on the other hand, is extremely compact in size and highly accurate in performance. Due to the construction and shape of its rotor there is negligible dynamic lag in its response and a high degree of accuracy in the static sense. Additionally, the invention will provide electrical signals which could be used to: (a) furnish feedback for a closed-loop position servomechanism, (b) furnish feedback for a speed control (velocity) servomechanism, or (c) furnish quadrature position reference signals for an automatic tracking servomechanism.

An object of the present invention is the provision of a shaft angle transducer.

Another object is to provide a shaft angle transducer which will furnish accurate remote indications of shaft position.

A further object is to provide a shaft angle transducer which has negligible dynamic lag in its response time.

A still further object is to provide a shaft angle transducer which will furnish feedback for a closed-loop position servomechanism.

A still further object is to provide a shaft angle transducer which will furnish feedback for a speed control servomechanism.

Yet another object of the present invention is the provision of a shaft angle transducer which utilizes a flux modulation principle for its operation.

Figure 1:
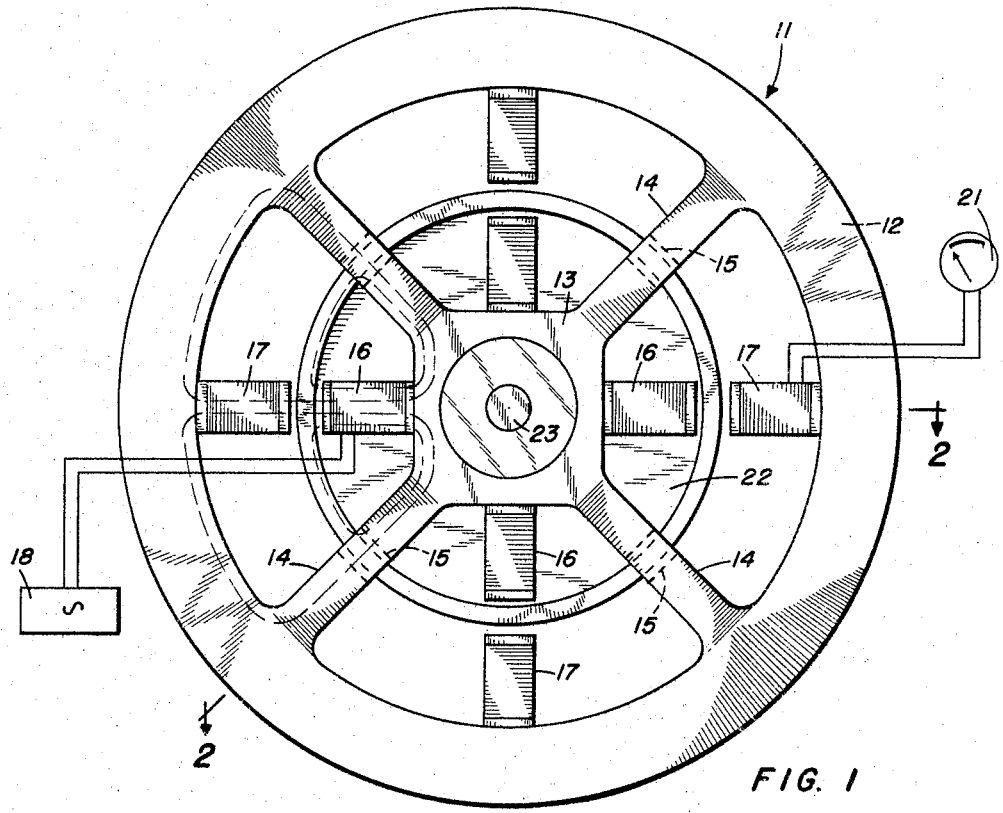
Figure 2:
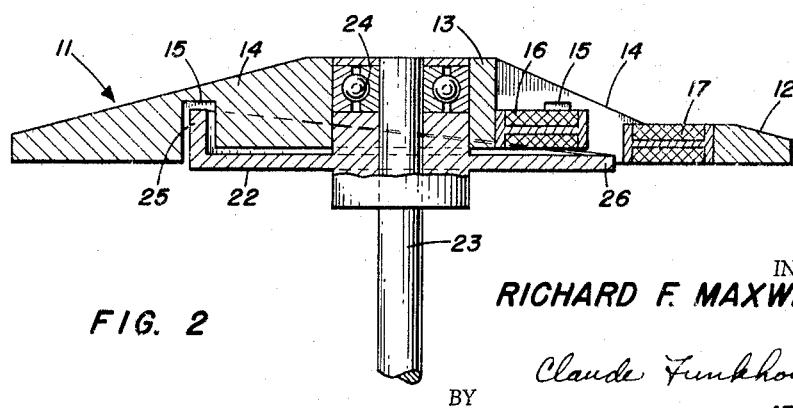

Other objects and many of the attendant advantages of the invention will be readily appreciated as the same becomes better understood by reference to the following detailed description when considered in connection with the accompanying drawings in which like reference numerals designate like parts throughout the figures thereof and where FIG. 1 shows a plan view of the transducer FIG. 2 shows a sectional view of the transducer, taken along the line 2—2 of FIG. 1.

Figure 3:
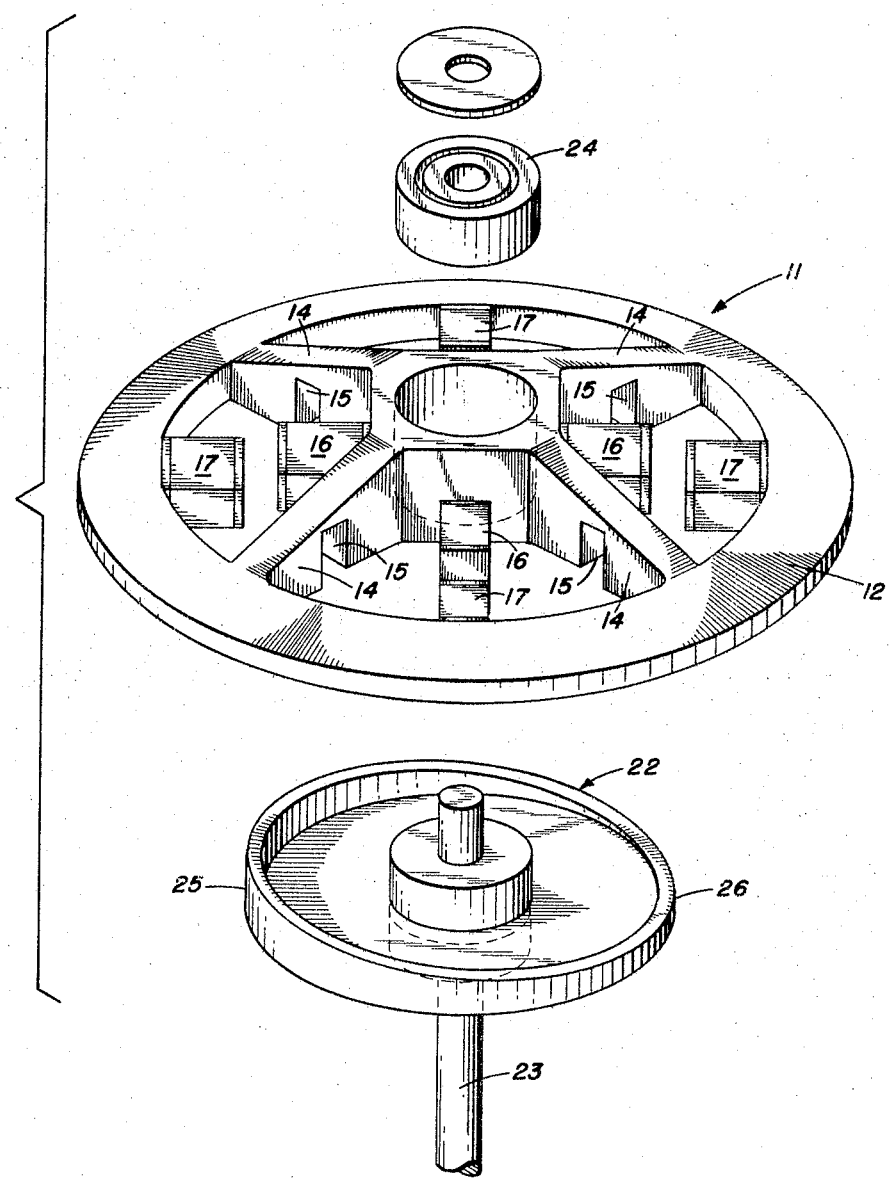

FIG. 3 shows a blown up schematic view of the transducer to disclose the configuration of the rooter.

Referring now to the drawings, wherein like reference characters designate like or corresponding parts throughout the several views there is shown in FIG. 1 a shaft angle transducer, indicated generally as 11, having a circular, wheel-like metal frame with an outer rim 12 and a hub 13, the rim 12 and hub 13 being connected by means of a plurality of spokes or webs 14. About half-way along the length of spokes 14, and in the underside thereof, is cut a rectangular channel or groove 15 forming a circular path and arranged to be concentric with and between rim 12 and hub 13.

Located between the spokes 14 and positioned so as to occur every 90° is a plurality of electromagnetic coils 16 and 17, coils 16 being rigidly mounted on hub 13 and coils 17 on rim 12. It will be noted that the coils 16 and 17 are so positioned on either side of channel 15 that the channel serves as a gap between the individual pairs of coils. The four centrally located coils 16 are all suitably connected together to form an excitation means and working together they produce an alternating magnetic flux throughout the hub 13 and rim 12 of the device, under the influence of any well-known signal source 18 which energizes the coils 16 at 400 cycles, for example, or at any other convenient frequency.

The outwardly situated coils 17 serve as pickup coils and are connected to any desirable utilization means 21 for indicating the angular position of a shaft. For the sake of illustration the utilization means 21 is shown in FIG. 1 as a meter. Pickup coils 17 are connected in two sets which are in space quadrature and the individual sets are connected so that a phase reversal of the excitation frequency occurs on each side of the null output position.

Positioned below the hub 13 and rim 12, and cooperating with them, is a light weight, metal rotor 22 having an axle 23 passing through the flat portion of the rotor and terminating between ball bearings 24 mounted in hub 13. Axle 23 is rigidly attached to and consequently turns with the external shaft (not shown) whose angular position the present invention is intended to follow.

The exploded view of FIG. 3 clearly shows the construction of rotor 22 which is shaped with a plane skew cut and has a high side 25 and a low side 26. When rotor 22 is in close proximity with rim 12, and the device is in operation to indicate shaft displacement, it will be observed (FIG. 2) that channel 15 is made deep enough to freely accommodate the high side 25 of rotor 22 as it turns in the channel. Additionally, with the rotor shaped in the particular plane skew cut shown, the coil outputs are sine and cosine functions of the shaft angle.

Turning now to the operation of the transducer, the axle 23 is rigidly connected to a shaft, whose angular position is being monitored, so that rotor 22 freely turns in its bearings 24 as the shaft rotates, causing the high side 25 of the rotor to assume various positions within the channel 15. Meantime, the excitation coils 16, spaced in quadrature around the hub 13 of the upper frame of the transducer, are being driven by an alternating current from external signal source 18 so that magnetic lines of flux are generated which pass out of coils 16, through hub 13, along spokes 14 to outer rim 12 where they couple with pickup coils 17 mounted along the rim 12. The flux path is shown by the dotted lines in FIG. 1.

As the rotor 22 rotates it is successively placed in the gap between the various excitation coils 16 and pickup coils 17. Since the rotor is made of metal it acts as a magnetic shield for a portion of the flux linking coils 16 and 17, the amount of the shielding being determined by the configuration of the rotor and how much of the metal is in the gap, between the extremes of maximum shielding when high side 25 is in place and the minimum when low side 26 is in the gap. The metallic rotor forms an alternate flux path as shown by the dotted lines in FIG. 1.

The rotor is shaped as shown in FIGS. 2 and 3 so that the magnetic flux through the rotor is a function of its angular position. Therefore, the flux to the outer pickup coil, and the resultant output voltage to the utilization means 21, is also a function of shaft position since the total flux available is constant. When the rotor is shaped with the particular plane skew cut as shown, the pickup coil outputs are sine and cosine functions of the shaft angle.

Inasmuch as the pickup coils are connected in two sets which are in space quadrature and the individual sets are connected so that a phase reversal of the excitation frequency occurs on each side of the null output position, the sine and cosine functions provided are continuous over a complete 360° rotation of the shaft.

From the above description it is obvious that the shaft position transducer making up the present invention offers considerable improvement over similar devices known in the prior art. While the ultimate utilization voltage is shown as a meter reading it is clear that it may take a variety of forms, such as feedback for a closed-loop position servomechanism or feedback for a speed control (velocity) servomechanism or as a quadrature position reference signal for an automatic tracking servomechanism.

Obviously many modifications and variations of the present invention are possible in the light of the above teachings. It is therefore to be understood that within the scope of the appended claims the invention may be practiced otherwise than as specifically described.

What is claimed is:

1. A shaft angle transducer comprising a circular wheel-like frame having a hub, spokes and a rim;
   a circular rotor disk rotatably mounted on said hub, said rotor disk having a raised edge around the outer periphery of the disk, said raised edge extending normal to the plane of the rotor disk;
   a plurality of energizing coils mounted on said hub; and
   a plurality of pickup coils mounted on said rim and inductively coupled with the energizing coils, the raised edge of the rotor disk moving between the energizing and pickup coils to reduce their inductive coupling.

2. A shaft angle transducer as described in claim 1 wherein
   the rotor has a plane skew cut configuration with a high side and a low side.

3. A shaft angle transducer as described in claim 2 wherein
   both the energizing and pickup coils are in spaced quadrature position.

4. A shaft angle transducer comprising a circular wheel-like frame having a hub and spokes and a rim;
   a plurality of energizing coils mounted on the hub in space quadrature position between the spokes;
   a plurality of pickup coils mounted on the rim opposite the energizing coils and spaced a short distance from them to form a gap;
   a groove in the underside of each spoke and cut transversely across the spoke, each groove being the same distance from the center of the frame as the gap between the coils, said grooves aligning with the gaps to form a continuous circular channel concentric with the rim of the frame;
   a circular rotor rotatably mounted in proximity with the frame; said rotor having raised edges normal to the plane of the rotor in a sloping skew cut from the high edge to the low edge; said high edge moving in the concentric channel and therefore in the gap between the energizing and pickup coils as the rotor is turned; and
   external utilization means for indicating changes in the voltage induced in the pickup coil when the rotor enters the gap between the coils.

5. The shaft angle transducer of claim 4 further including
   an external signal source for driving the energizing coils.

6. The shaft angle transducer of claim 5 wherein
   the pickup coils are interconnected to form two sets and the sets are positioned in space quadrature.

7. The shaft angle transducer of claim 6 wherein
   the skew cut edges of the rotor are so shaped that the pickup coil outputs are sine and cosine functions of the shaft angle rotation.

8. The shaft angle transducer of claim 6 wherein
   the sine and cosine functions provided are continuous over a complete 360° rotation of the shaft.

References Cited by the Examiner

UNITED STATES PATENTS

| 705,482 | 7/02 | Thiermann | 340—198 |
| 2,068,116 | 1/37 | Shotter | 340—196 |
| 2,862,163 | 11/58 | Nissenson | 340—198 |
| 3,047,846 | 7/62 | Koscheleff | 340—199 |
| 3,064,191 | 11/62 | Dever | 340—196 |
| 3,105,212 | 9/63 | Schwartz | 340—199 |

NEIL C. READ, *Primary Examiner.*

THOMAS B. HABECKER, *Examiner.*